April 24, 1928.
L. SHAPIRO
1,667,497
PHASE SHIFTER
Filed Aug. 27, 1923
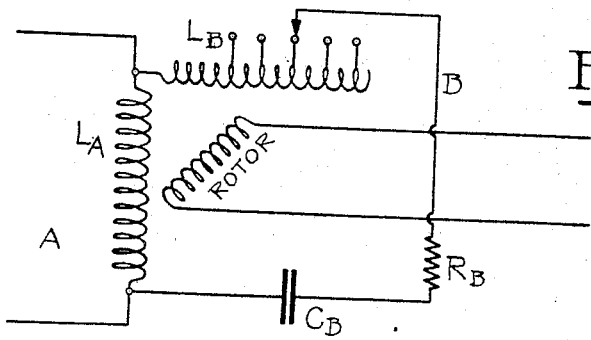
Fig. 1
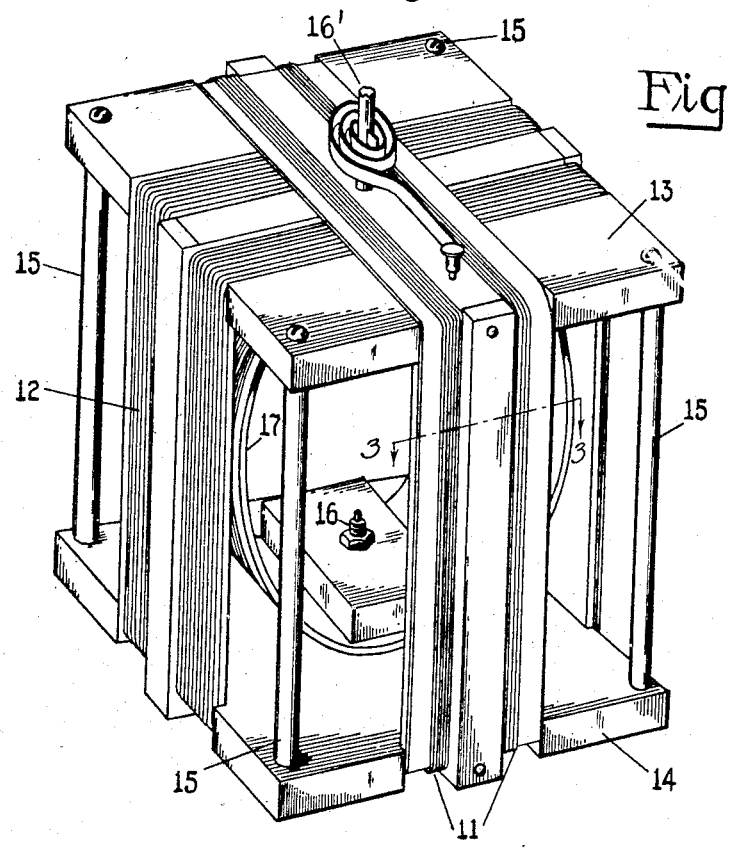
Fig. 2
Fig. 3
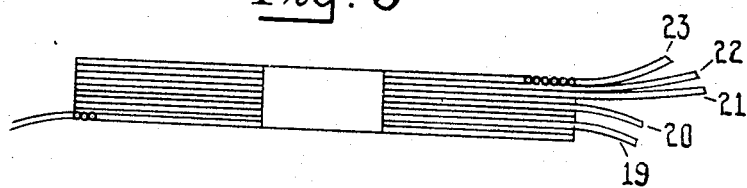
Inventor
L. SHAPIRO
By his Attorney Patented Apr. 24, 1928.

1,667,497

UNITED STATES PATENT OFFICE.

LAZARUS SHAPIRO, OF NEW YORK, N. Y., ASSIGNOR TO RADIO CORPORATION OF AMERICA, A CORPORATION OF DELAWARE.

PHASE SHIFTER.

Application filed August 27, 1923. Serial No. 659,424.

This invention relates to improvements in arrangements for shifting the phase of alternating currents and particularly to an arrangement for decreasing the losses therein without interfering with the normal functions of the device. The characteristics normally desired may be explained in the application of the device to radio receiving circuits in which it is desired to neutralize interference from undesired signals or strays. To secure an electromotive force to exactly oppose the interfering E. M. F. it is necessary to secure exact opposition of phase as well as equal magniture. Assuming that the adjustment of the magnitude is secured outside the phase shifter, it is obviously desirable that the phase adjustment should not affect the magnitude. Also, the adjustment of magnitude should not affect the phase. As is well known, the ordinary phase shifter accomplishing these normal functions introduces considerable resistance in the circuit in which it is used and consequently considerable resistance or $I^2R$ losses.

The ordinary phase shifter is essentially a coupling device comprising stationary and rotatable elements, one of which usually contains two coils carrying currents out of phase with each other while the other element is a single or double coil coupled to the first two coils. By appropriate adjustment of the latter coil or coils relative to the two coils carrying the out of phase currents, any desired intermediate phase may be secured therein. In a known type of phase shifter, the rotor is a single coil from which the desired E. M. F. is obtained. The stator, which is connected to the input line, consists of a split circuit, one branch containing an inductance and a resistance having the same impedance so that the current lags 45° behind the applied voltage, and the other branch containing resistance of the same value as the resistance of the first branch and an inductance and a capacity of such value that the current leads the applied electromotive force by 45°, so that the currents in the two branches are 90° out of phase. The currents in the two branches are equal, and, as the resistances are equal, the losses in the two branches are the same. It can be shown that the total loss in the two branches is $I^2R$ where R is the value of the resistance of each branch and I the total input current.

In accordance with the principal aspect of my invention the impedances in the branches of the divided circuit are unequal, the coupling of the branches to the other member being also unequal in such manner that the E. M. F. induced in the position of maximum coupling is the same for both branches. The branches have unequal resistance, the greater current being in the branch having the lower resistance, so that the power loss is reduced.

More particularly, my invention uses a divided circuit in which the current in one branch is substantially 90° out of phase with the impressed electromotive force and the current in the other branch is substantially in phase with the impressed electromotive force.

In accordance with the invention, I preferably utilize a divided circuit in which one branch contains resistance to govern the magnitude of the current in this branch, and inductance and capacity which are tuned or adapted to be tuned to the frequency of the applied electromotive force, while the other branch contains substantially only inductance, the resistance being made as small as is practicable. The current in the first-named branch is but a small fraction of the total current.

Another important feature of the invention resides in the use of a variable inductance in the stator, preferably a tapped inductance, which as explained hereinafter serves for simultaneous frequency and magnitude adjustment.

The novel features which I believe to be characteristic of my invention are particularly set forth in the appended claims. My invention itself, however, both as to its organization and method of operation, will best be understood by reference to the following description and explanation taken in connection with the accompanying drawing in which:

Fig. 1 is a diagrammatic representation of the electrical circuits of one type of phase shifter for carrying my invention into effect.

Fig. 2 is a perspective view of a convenient coil arrangement, and

Fig. 3 is a sectional view along line 3—3 of Fig. 2 illustrating the method of providing coil tap leads for the tuned branch.

The particular embodiment shown for the purpose of illustrating without limiting the invention utilizes two parallel branches in the stator connected to the input and a single winding in the rotor connected to the output. One branch A consists of practically pure inductance $L_A$ and the other branch B consists of a resistance $R_B$, an inductance $L_B$ and a capacity $C_B$ in series, the inductance and capacity being substantially tuned to the applied frequency. If the coil $L_A$ had no resistance whatever the current in the branch A would lag 90° behind the voltage, while the current in the branch B, which is tuned, will be in phase with the voltage. The currents are therefore in quadrature, as in the usual phase shifter. In practice the coil $L_A$ will, of course, have some resistance so that the current in it will lag somewhat less than 90° behind the applied electromotive force. If desired, as a refinement the branch B may be slightly detuned by decreasing either the inductance or the capacity so as to introduce a small capacitive reactance and cause the current in branch B to lead the applied electromotive force by a small angle and secure an exact quadrature relation between the currents. Throughout the remainder of the description the invention will be more or less set forth in connection with its mathematical theory, although it will be understood that I do not intend to limit my invention thereto. For simplicity the phase difference of the coil $L_A$ will be neglected and the theory of the refinement above described will not specifically be considered, as the operation can be more readily explained without considering the effect of the detuning.

The current in branch A will depend upon the frequency and the inductance of coil $L_A$, and the current in branch B will depend only upon the resistance $R_B$. The ratio of the currents in A ($I_A$) and B ($I_B$) will be $$\frac{I_A}{I_B} = \frac{R_B}{wL_A} \quad (1)$$

where $w$ is the angular frequency. Ideally this ratio may be made of any desired value, depending on the resistance $R_B$ and the inductance $L_A$. In accordance with the invention the current $I_A$ in branch A will be made large in comparison with the current $I_B$ in branch B; that is, the value of $\frac{I_A}{I_B}$ will be a number considerably greater than unity. In the ideal case there would be no $I^2R$ loss in branch A and the $I^2R$ loss in branch B could be made infinitely small, by making the resistance $R_B$ infinitely large; so that the total loss would be infinitely small. In other words, it is possible, by a proper choice of circuit constants, to make the proportion of the total current which flows through the resistance element sufficiently small so that the losses in the resistance are low and with a substantially pure inductance $L_A$ the resistance losses therein will also be low.

A consideration of the power factor of the stator circuit will show this to be true. The total stator current is obviously $$I_S = \sqrt{I^2_A + I^2_B} \quad (2)$$

while the in-phase current, neglecting the phase difference of the coil $L_A$, is simply $I_B$. The power factor of the stator circuit is the ratio of these two currents, or $$P_S = \frac{I_B}{\sqrt{I^2_A + I^2_B}} \quad (3)$$

If now the ratio $$\frac{I_A}{I_B} = \frac{R_B}{wL_A}$$

be made very large, the expression $$\sqrt{I^2_A + I^2_B}$$

becomes practically equal to $I_A$, whence the power factor becomes $$P_S = \frac{I_B}{I_A} = \frac{wL_A}{R_B} \quad (4)$$

so that by making the ratio $\frac{R_B}{wL_A}$ large we may make the power factor correspondingly small. There are, however, certain practical limitations which prevent the indefinite increase of $\frac{R_B}{wL_A}$. Consider, for example, the construction illustrated, with the same rotor coil coupled to the two stator coils. In order to make the maximum E. M. F.'s induced in the rotor coil by the two stator coils equal in magnitude, the ratio of the mutual inductances $M_A$, $M_B$ of the stator coils with respect to the rotor must be the inverse of the ratios of the currents. That is, in order that the two E. M. F.'s $$E_A = M_A I_A \text{ and } E_B = M_B I_B$$

shall be equal, we must have $$M_A I_A = M_B I_B \text{ or } \frac{M_A}{M_B} = \frac{I_B}{I_A} \quad (5)$$

Now suppose, further, that the stator coils are of equal length and similar in shape. Then, in accordance with the well-known laws governing mutual inductance, if $N_A$ and $N_B$ are the number of turns in the coils, $$\frac{N_A}{N_B} = \frac{M_A}{M_B} = \frac{I_B}{I_A} = \frac{wL_A}{R_B} \quad (6)$$

Furthermore, continuing the same supposition relative to the size and shape of the coils, the ratio of the inductances $L_A$ and $L_B$ is equal to the square of the number of turns, or $$\frac{L_A}{L_B} = \frac{N^2_A}{N^2_B} = \frac{w^2 L^2_A}{R^2_B} \quad (7)$$

or $$L_B = \frac{R^2_B}{w^2 L_A} \quad \text{or} \quad \frac{wL_A}{R_B} = \frac{R_B}{wL_B} \quad (8)$$

The ratio of the resistance to the reactance of either the capacity or the inductance of the tuned branch, or the power factor of the tuned branch, is $$P_B = \frac{R_B}{wL_B} = \frac{wL_A}{R_B} \quad (9)$$

It will be seen that the latter is the same as the power factor of the entire stator $P_S$ (equation 4). This shows that as the current ratio becomes higher the power factor $P_B$ of the tuned branch becomes lower. Now this is the condition for sharp tuning of the tuned branch B and if the tuning becomes too sharp this will require an excessive number of taps (hereinafter referred to in greater detail) to cover a given frequency range. Furthermore, a slight reaction between the rotor and the tuned branch may detune the latter considerably. This, therefore constitutes a limitation to the current ratio $\frac{R_B}{wL_A}$ which may be used in commercial practice.

A further limitation is the capacity of the tuned branch. Neglecting the small correction for phase quadrature the capacity of the tuned branch is $$C_B = \frac{1}{w^2 L_B} \quad (10);$$

but $$L_B = \frac{R^2_B}{w^2 L_A} \quad (8)$$

hence $$C_B = \frac{L_A}{R^2_B} \quad (11)$$

The capacity $C_B$ therefore varies inversely as the square of the resistance $R_B$. If $R_B$ is increased greatly $C_B$ eventually reaches a value which approximates the distributed capacity of the coil $L_B$, so that the dielectric loss of the latter becomes excessive.

It might be supposed that it would be possible to compensate for the difference in current by using separate rotor coils for the two stator branches to secure a low power factor in the stator without resorting to a correspondingly low power factor in the tuned branch. However, an analysis of this form from a structural and a mathematical viewpoint does not disclose any material advantages and shows certain disadvantages, so that this form will not be discussed in detail.

Another important feature of my invention resides in the fact that it is not necessary to vary both the resistance and a tuning element in the tuned stator branch to secure proper phase and magnitude adjustments. Preferably only the tuning element will be varied, for example, by providing a number of taps on the coil $L_B$. The reasons why, when this is done, the resistance need not be also varied may be shown by the following discussion. As previously shown for equal amplitudes $$\frac{L_A}{L_B} = \frac{w^2 L^2_A}{R^2_B} \quad (7)$$

for $$L_B = \frac{R^2_B}{w^2 L_A} \quad (8);$$

$L_A$ and $R_B$ being constant. That is, the inductance $L_B$ for equal amplitudes is inversely proportional to the square of the frequency.

For proper phase adjustment or tuning of the circuit B $$C_B = \frac{1}{w^2 L_B} \quad (10)$$

or $$L_B = \frac{1}{w^2 C_B}$$

or, if the capacity $C_B$ is constant, the inductance $L_B$ necessary for proper phase adjustment of the currents in the branches is also inversely proportional to the square of the frequency. It will therefore be seen that the adjustment of the inductance $L_B$ for tuning to different frequencies simultaneously adjusts the stator circuit so that the same contant maximum amplitude results for each branch.

The phase of the resultant currents in the rotor will depend on its position relative to the stator coils in the same manner as it does in the ordinary type of phase shifter. It is important that the circuit into which the rotor is connected should have a high impedance as compared with that of the rotor, as otherwise the reaction between the rotor and stator may detune the tuned branch.

Fig. 2 shows a suitable arrangement of the coils of the single rotor type. In this figure the casing, adjusting knob and fine adjustment gears for the rotor, the fixed condenser and the connections are omitted for convenience of illustration as these may be made in any appropriate manner. The mounting for the tuned branch coil 11 and the untuned branch coil 12 consists of square end pieces 13, 14, spaced apart by means of four bolts 15. Suitable openings are provided in the center of each end piece for the pins 16, 16' which provide the axis of rotation of the rotor. The coils 11 and 12 are preferably similar in shape and each consists of a winding split into portions lying on opposite sides of the shaft members and fitting in slots in the end pieces as shown. For convenience in construction and repair one or all of the bolts 15 is made removable and the corner opening is made of such size that the rotor 17 may be inserted and withdrawn therethrough by removing the pins 16, 16'. As it is desirable to have the tapped coil 11 retain a constant shape for all taps, the taps of the tuned coil are made in a special manner as shown in the cross section of Fig. 3. The coil is wound with a number of layers and the taps are arranged so that sections of the coil which are not to form a part of the tuned circuit have the form of whole or fractional layers. By this method the shape of the used portion of coil 11 is maintained approximately the same and the proportionality between the inductance and the square of the number of turns which has been shown to be essential is not disturbed. For successively smaller coil sections taps 20, 21, 22, 23 will be used. For convenience of illustration in the drawing these are shown as coming out at the ends of the layers, although they may be tapped out at any desired points. In case it is undesirable to wind the tapped coil in layers it will be preferable to disconnect the inner portion of the coil rather than the outer portion as this maintains the similarity of the shape of the coil to a greater degree.

Although my invention has been described in detail as applied to a single rotor coil and a branched stator having one tuned branch, the invention may be readily applied to any of the ordinary variations used in phase shifters, such as a branched rotor and a single stator or a pair of rotors or stators with a branched stator or rotor.

Having described my invention what I claim is:

1. A phase shifter having a rotor and a stator, one of which comprises a branched circuit, said branches having unequal resistance and comprising impedances adapted to pass the greater part of the current through the branch having the lesser resistance.

2. A phase shifter for radio frequency currents having a rotor and a stator, one of which comprises a branched circuit, one of said branches comprising impedance adapted to maintain the current substantially in phase with the impressed electromotive force and the other branch comprising impedance adapted to substantially dephase the current and the impressed electromotive force.

3. A phase shifter for radio frequency currents having a rotor and a stator, one of which comprises a branched circuit, said branches having unequal resistance, the branch of higher resistance comprising impedance adapted to maintain the current substantially in phase with the impressed electromotive force and the branch of lower resistance comprising impedance adapted to substantially dephase the current and the impressed electromotive force.

4. A phase shifter for radio frequency currents having a rotor and a stator, one of which comprises a branched circuit, one of said branches comprising impedance adapted to maintain the current substantially in phase with the impressed electromotive force and the other branch consisting of substantially pure inductance whereby the currents in the branches are substantially 90° out of phase.

5. A phase shifter for radio frequency currents having a rotor and a stator, one of which comprises a branched circuit, said branches having unequal resistance, the branch of higher resistance comprising impedance adapted to maintain the current substantially in phase with the impressed electromotive force and the other branch consisting of substantially pure inductance.

6. A phase shifter for radio frequency currents having a rotor and a stator, one of which comprises a branched circuit, said branches having unequal resistance, the branch of higher resistance comprising impedance adapted to maintain the current substantially in phase with the impressed electromotive force and to pass the smaller part of the current, and the branch of lower resistance comprising substantially pure inductance, whereby the currents in the branches are substantially 90° out of phase.

7. A phase shifter for radio frequency currents having a rotor and a stator, one of which comprises a branched circuit, one of the said branches comprising inductance and capacity adapted to be tuned to substantially the applied frequency.

8. A phase shifter for radio frequency currents having a rotor and a stator, said stator having a branched circuit, one of said branches comprising inductance and capacity and means for varying said inductance to vary the tuning of said branch.

9. A phase shifter for radio frequency currents having a rotor and a stator, said stator having a branched circuit, one of said branches comprising inductance and capacity and plurality of taps from said inductance for varying the tuning of said branch.

10. A phase shifter for radio frequency currents having a rotor and a stator, said stator having a branched circuit, one of said branches comprising inductance and capacity and a high resistance, and means for varying said inductance to vary the tuning of said branch.

11. A phase shifter for radio frequency currents having a rotor and a stator, one of which comprises a branched circuit, said branches having unequal resistance, the branch of high resistance comprising inductance and capacity adapted to be tuned to substantially the applied frequency.

12. A phase shifter for radio frequency currents having a rotor and a stator, one of which comprises a branched circuit, said branches having unequal resistance, the branch of high resistance comprising inductance and capacity adapted to be tuned to substantially the applied frequency and the branch of low resistance comprising substantially pure inductance.

13. A phase shifter for radio frequency currents having a rotor and a stator, one of which comprises a branched circuit, one of said branches comprising an inductance, a capacity, and a resistance adapted to be tuned to substantially the applied frequency.

14. A phase shifter for radio frequency currents having a rotor and a stator, one of which comprises a branched circuit, said branches having unequal resistance, the branch of high resistance comprising an inductance, a capacity, and a resistance adapted to be tuned to substantially the applied frequency.

15. A phase shifter for radio frequency currents having a rotor and a stator, one of which comprises a branched circuit, said branches having unequal resistance, the branch of high resistance comprising an inductance, a capacity, and a resistance adapted to be tuned to substantially the applied frequency and the branch of low resistance comprising substantially pure inductance.

16. A phase shifter for radio frequency currents comprising a rotor and a stator, one of which comprises a pair of coils at right angles in different branch circuits, and a condenser and a resistance in one of the branch circuits and in series with one of the coils, said branch being tuned to substantially the applied frequency.

17. A phase shifter for radio frequency currents having a rotor and a stator, one of which comprises a branched circuit, said branches having unequal resistance, the branch of higher resistance comprising an inductance, a capacity, and a resistance adapted to be tuned to substantially the applied frequency, said branch being adapted to pass the lesser part of the current.

18. A phase shifter for radio frequency currents comprising a rotor and a stator, one of which comprises a pair of coils at right angles in different branch circuits, and a condenser and a resistance in one of the branch circuits and in series with one of the coils, said branch being tuned to substantially the applied frequency and adapted to pass the lesser part of the current.

19. A phase shifter for radio frequency currents comprising a rotor and a stator, one of which comprises a pair of coils at right angles in different branch circuits, and a condenser and a resistance in one of the branch circuits and in series with one of the coils, said last mentioned coil having a plurality of taps for tuning the branch to the applied frequency.

20. A phase shifter comprising a rotor and a stator, one of which comprises a pair of coils at right angles in different branch circuits, and a condenser and a resistance in one of the branch circuits, and in series with one of the coils, said last mentioned coil having a plurality of layers and taps for disconnecting parts of the coil for tuning to the applied frequency, said taps being disposed to maintain the shape of the used portion substantially like the shape of the entire coil.

LAZARUS SHAPIRO.